(12) United States Patent
Kaplan et al.

(10) Patent No.: US 8,892,531 B2
(45) Date of Patent: *Nov. 18, 2014

(54) SCALABLE FILE MANAGEMENT FOR A SHARED FILE SYSTEM

(71) Applicant: International Business Machines Corporation, Armonk, NY (US)

(72) Inventors: Marc A. Kaplan, Hawthorne, NY (US); Wayne A. Sawdon, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/685,593

(22) Filed: Nov. 26, 2012

(65) Prior Publication Data

US 2013/0086135 A1     Apr. 4, 2013

Related U.S. Application Data (63) Continuation of application No. 12/540,176, filed on Aug. 12, 2009, now Pat. No. 8,341,130.

(51) Int. Cl.
*G06F 17/00* (2006.01)
*G06F 17/30* (2006.01)

(52) U.S. Cl.
CPC ...... *G06F 17/3007* (2013.01); *G06F 17/30165* (2013.01); *G06F 17/30129* (2013.01)
USPC ............................ 707/694; 707/704; 707/827

(58) Field of Classification Search
USPC .......... 707/634, 694, 704, 999.101, 690, 700, 707/825, 828, 827
See application file for complete search history.

(56) References Cited

U.S. PATENT DOCUMENTS

| | | | | |
|---|---|---|---|---|
| 6,718,327 | B1* | 4/2004 | Edmonds | 1/1 |
| 7,007,024 | B2* | 2/2006 | Zelenka | 707/741 |
| 7,092,976 | B2* | 8/2006 | Curran et al. | 1/1 |
| 7,600,075 | B2 | 10/2009 | Cousins | |
| 2007/0174580 | A1 | 7/2007 | Shulga | |
| 2013/0151683 | A1* | 6/2013 | Jain et al. | 709/223 |

FOREIGN PATENT DOCUMENTS

WO     2004061605 A2     7/2004

OTHER PUBLICATIONS

U.S. Non-Final Office Action for U.S. Appl. No. 12/540,176 mailed Nov. 9, 2011.
U.S. Final Office Action for U.S. Appl. No. 12/540,176 mailed Apr. 4, 2012.
U.S. Notice of Allowance for U.S. Appl. No. 12/540,176 mailed Aug. 16, 2012.

* cited by examiner

*Primary Examiner* — Marc Filipczyk
(74) *Attorney, Agent, or Firm* — Kenneth L. Sherman, Esq.; Michael Zarrabian, Esq.; Sherman & Zarrabian LLP (57) ABSTRACT

Managing a shared file system comprising a directory and files stored on a multiple storage devices shared by plural processing nodes, is provided. A plurality of parallel directory traversal records are partitioned into a plurality of ranges to allow for the records in each range to be written independently in parallel by plural processing nodes during parallel directory traversal. Parallel operations are performed comprising parallel directory traversal of all directory paths and files in the shared file system.

19 Claims, 7 Drawing Sheets

SCALABLE FILE MANAGEMENT FOR A SHARED FILE SYSTEM

CROSS-REFERENCE TO RELATED APPLICATIONS

This patent application is a continuation patent application of U.S. patent application Ser. No. 12/540,176, filed on Aug. 12, 2009, the disclosure of which is incorporated herein its entirety by reference.

BACKGROUND

1. Field of the Invention

The present invention relates generally to file management. In particular, the present invention relates to file management in shared file systems.

2. Background of the Invention

Advances in disk storage technology allow file systems to manage large volumes of data, with increasing number of files stored in a single file system. Typically a file manager traverses the file system for selecting candidate files that may be of interest to a user. As users require operations such as backup to complete within an assigned window, often 8 to 24 hours, candidate file selection performance becomes a limiting factor on the number of files that can be managed by the file manager within a single file system. Therefore, administrators typically "split" collections of files into large numbers of smaller file systems, resulting in higher costs for provisioning and management.

Conventional techniques for candidate file selection have the file manager traversing the file system directory structure and performing a "stat" operation on every file and every directory. The "stat" operation involves retrieving the attributes of a file or directory necessary to determine if a file is a candidate. Typically, this is performed by reading the file "inode" which contains information about the file, such as size and the last time it was changed. The inode does not contain the file name. The file names are stored in a directory structure which includes file names and corresponding inode numbers. The stat is also necessary for locating sub-directories, which must also be traversed by the file manager to locate all files in the file system.

Performing candidate selection in such a manner requires a minimum of one stat operation for every file or directory. Typically, the directories impose an arbitrary order on the files, causing the stat operations to generate random small reads of file metadata. The file manager has no knowledge of the number files and/or subdirectories that reside beneath an arbitrary directory in the namespace.

BRIEF SUMMARY

A method is provided for managing a shared file system including a directory and files stored on multiple storage devices shared by plural processing nodes. In one embodiment the method comprises performing parallel directory traversal of all directory paths and files in the shared file system utilizing a node-wise parallel directory traversal. Each node maintains a local workload queue of elements, the elements representing a plurality of un-read directories. A master node monitors traversal processing workload of the plurality of the nodes and dynamically re-balances the workload across the plurality of nodes based on the monitored workloads.

Another embodiment for managing a shared file system comprises partitioning a plurality of parallel directory traversal records into a plurality of ranges to allow for the records in each range to be written independently in parallel by plural processing nodes during parallel directory traversal. A plurality of file inodes are scanned in parallel by reading, with pre-fetching, full storage units of inodes from each of the plurality of ranges of directory traversal records. A file inode comprises file attributes, and the plurality of inodes represent all the files in the shared file system in inode number order in an inode file, such that the inodes read are specified by said records. Each set of records comprising a range is sorted by inode number.

Further, a computer program product for managing a shared file system comprising a directory and files stored on multiple storage devices shared by plural processing nodes, is provided. The computer program product comprises a computer usable medium having computer readable program code embodied therewith, wherein the computer readable program when executed on the computer causes the computer to perform parallel directory traversal of all directory paths and files in the shared file system utilizing a node-wise parallel directory traversal. A local workload queue of elements is maintained at each node, the elements representing a plurality of un-read directories. A master node monitors traversal processing workload of the plurality of the nodes, and dynamically re-balances the workload across the plurality of nodes based on the monitored workloads.

Another embodiment comprises a data processing system, comprising multiple information storage nodes and multiple processing nodes, each processing node comprising a central processing unit for executing computer usable program code. The system further comprises computer usable program code configured to perform a parallel directory traversal of all directory paths and files in a shared file system utilizing a node-wise parallel directory traversal, and maintain a local workload queue of elements at each node, the elements representing a plurality of un-read directories, wherein traversal processing workload of the plurality of the nodes is monitored by a master node and dynamically re-balanced across a plurality of nodes based on the monitored workloads.

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc. The description may disclose several preferred embodiments for file management in a shared file system. While the following description will be described in terms of such languages for clarity and placing the invention in context, it should be kept in mind that the teachings herein may have broad application to all types of systems, devices and applications.

Scalable file management for a shared file system is provided. One embodiment comprises a file management system for efficient sorting using a file system itself to share data between processes running in parallel across several computing nodes in a storage cluster (e.g., FIG. 1A, described further below). The file management system is scalable, wherein as the number of nodes increases the degree of parallelism increases. This reduces the time required for candidate file selection. This scalable system enables file management for extremely large file systems with a multitude (e.g., many millions and billions) of files.

In one example of the scalable file management, a large shared file system allows sharing data between processes running in parallel across a plurality of storage devices in a cluster, providing scalable file management. File management comprises using a plurality of processing nodes for performing a parallel directory traversal of all paths and files in the shared file system stored on a plurality of storage devices by a master node. Each processing node comprises a local work queue of elements, the elements representing a plurality of un-read directories. A plurality of execution threads are implemented to read the elements from the local work queue.

A plurality of parallel directory traversal records are partitioned into plural buckets, wherein the records in the buckets are written independently in parallel by the plurality of processing nodes during parallel directory traversal. A plurality of file inodes is scanned in parallel by reading (with prefetching) full disk blocks or tracks of inodes from a plurality of pre-assigned buckets. Each file inode comprises file attributes, wherein the plurality of inodes represents all the files of the shared file system in inode number order in an inode file.

Metadata associated with the inode file representing all the files of the shared file system, is retrieved in inode number order and evaluated. If a processing node fails to perform an inode scan of a pre-assigned bucket, the inode scan of the pre-assigned bucket is re-assigned to another processing node. The plurality of execution threads may use a plurality of local mutual exclusions (mutexes) to resolve contention for access to a plurality of local process resources. The master node monitors a workload queue length of the plurality of processing nodes and dynamically re-balances the workload across the plurality of computing nodes.

The parallel directory traversal of the shared file system is executed using a node-wise parallel directory traversal, and may be executed using a thread-wise parallel directory traversal. Further, the plurality of parallel directory traversal records in the buckets may be partitioned based on a sequence ordered by inode number.

An implementation of the disclosed scalable file management system using a shared file system is described herein below. A general parallel file system (GPFS) conforming to the Portable Operating System Interface for Unix (POSIX) standard for file systems is utilized as the shared file system.

One embodiment of a computing environment incorporating and/or using aspects of the present invention is described with reference to FIG. 1A. Computing environment 10 includes one or more nodes 12 (e.g., Node 1, . . . , Node N), which share access to one or more storage devices 14 (e.g., Disk 1, . . . , Disk m). The nodes are coupled to each other and to the storage devices via an interconnect 16. In one example, the interconnect includes a wire connection, token ring or network connection. One communication protocol used by one or more of these connections is TCP/IP. As one example, a node 12 includes an operating system 20 (FIG. 1B), such as the AIX operating system, offered by International Business Machines Corporation (IBM). The operating system includes a file system 22 (e.g., a software layer), such as GPFS, offered by IBM, which is used to manage one or more files located in the various storage devices. In one example, each file is associated with a directory and in particular, with a directory block of a directory. A directory includes one or more directory blocks, and each directory block has associated therewith zero or more files (a computing environment may include one or more directories). Further, each file may have associated therewith metadata that includes, for example, file attributes, such as file size, last-modified time, and file owner. This metadata is contained within a data structure, referred to as an inode.

Figure 2:
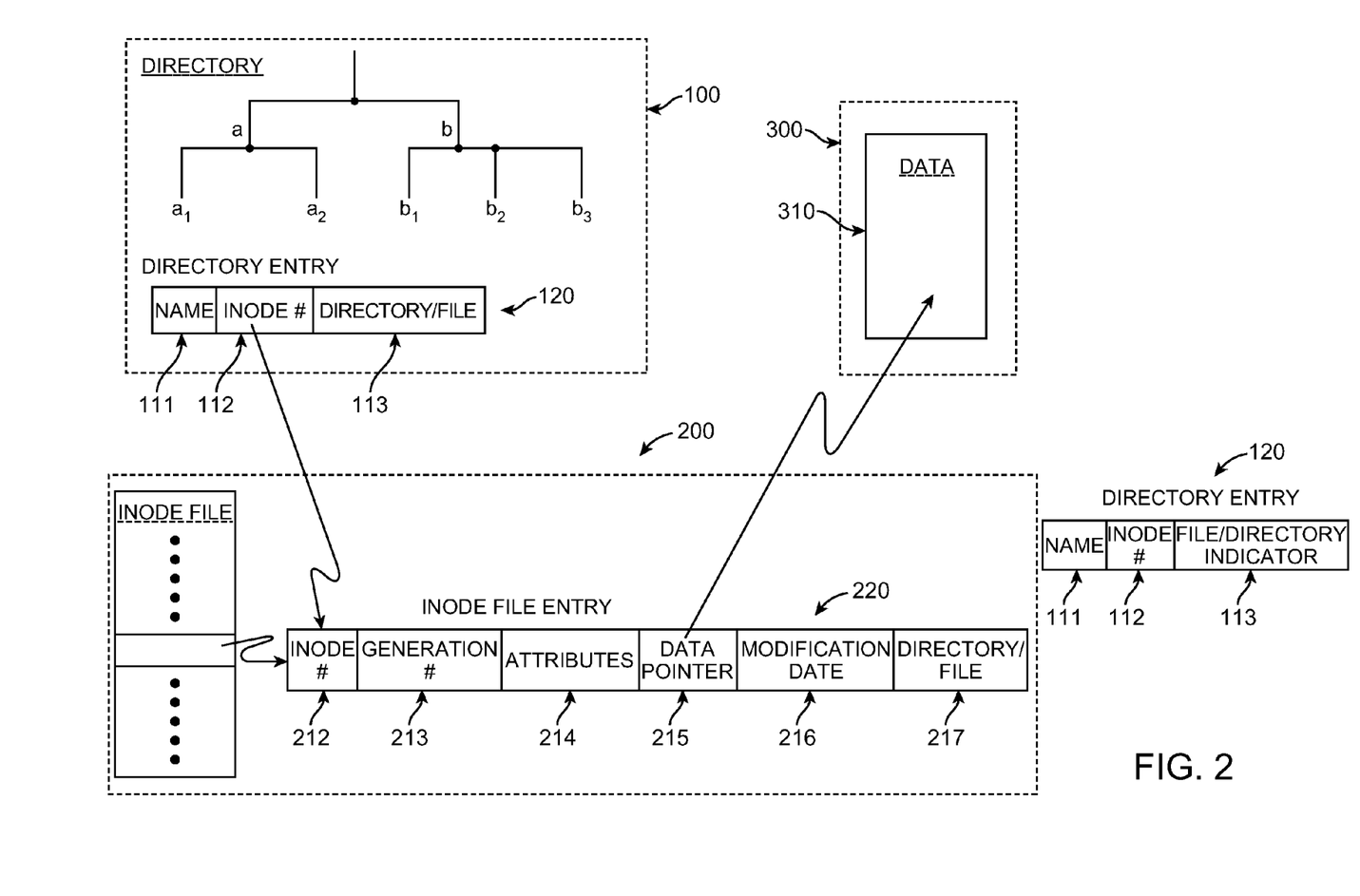
FIG. 2 shows an example general parallel file system (GPFS) implementing the disclosed file management system.

FIG. 2 shows a block diagram of an example of a file system managed by an embodiment of a scalable file management system disclosed herein. The file system includes directory tree 100, inode file 200 and data 300. These three elements are typically present in a file system as files themselves. For example as shown in FIG. 2, inode file 200 comprises a collection of individual records or entries 220. There is only one inode file per file system. Entries in directory tree 100 include a pointer 112 comprising an integer quantity which operates as a simple index into inode file 200. Entries 217 are employed to denote a file as being a directory.

A directory comprises a file in which the names of the stored files are maintained in an arbitrarily deep directory tree. The directory tree is a collection of directories which includes all of the directories in the file system. A directory is a specific type of file, which is an element in the directory tree. A directory is a collection of pointers to inodes which are either files or directories which occupy a lower position in the directory tree. A directory entry is a single record in a directory that points to a file or directory. FIG. 2 shows an example directory tree within block 100, wherein a directory entry 120 includes file name 111, inode number 112 and may further include a file/directory indicator 113.

While FIG. 2 illustrates a hierarchy with only two levels, it should be understood that the depth of the hierarchical tree structure of a directory is not limited to two levels (there may be dozens of levels present in any directory tree). The depth of the directory tree does, nevertheless, contribute to the necessity of multiple directory references when only one file is needed to be identified or accessed. However, in all cases the "leaves" of the directory tree are employed to associate a file name 111 with entry 220 in inode file 200. The reference is by "inode number" 112 which provides a pointer into inode file 200. There is one inode array in file systems of the type considered herein. The inode array may comprise the inode file 200 and the index points to the array element (e.g., inode #10876 is the 10876$^{th}$ array element in inode file 200).

Typically pointer 112 is a simple index into inode file 200 which is thus accessed in an essentially linear manner. Thus, if the index is 10876, it points to the 10876$^{th}$ record or array element of inode file 200. Name entry 111 allows one to move one level deeper in the tree. In typical file systems, name entry 111 points to, e.g. inode #10876, which is a directory or a data file. If it is a directory, one recursively searches in that directory file for the next level of the name. For example, assume that entry 111 is "a," as illustrated in FIG. 2. One would then search the data of inode #10876 for the name entry with the inode for "a2." If name entry 111 points to data, one has reached the end of the name search. The name entry 111 may include an additional field 113 which indicates whether this is a directory or not. The directory tree structure is included separately because POSIX allows multiple names for the same file in ways that are not relevant to either the understanding or operation of the present invention.

Directory tree 100 provides a hierarchical name space for the file system in that it enables reference to individual file entries by file name, as opposed to reference by inode number. Each entry in a directory points to an inode. That inode may be a directory or a file. Inode 220 is determined by the entry in field 112 which preferably is an indicator of position in inode file 200. Inode file entry 220 in inode file 200 is typically, and preferably, implemented as a linear list. Each entry in the list preferably includes a plurality of fields: inode number 212, generation number 213, individual file attributes 214, data pointer 215, date of last modification 216 and indicator field 217 to indicate whether or not the file is a directory. Other fields not of interest or relevance to the present invention are also typically present in inode entry 220. The inode number is unique in the file system. The file system preferably also includes generation number 213 which is typically used to distinguish a file from a file which no longer exists but which had the same inode number when it did exist.

Inode field 214 identifies certain attributes associated with a file. These attributes include, but are not limited to: date of last modification; date of creation; file size; file type; parameters indicating read or write access; various access permissions and access levels; compressed status; encrypted status; hidden status; and status within a network. Inode entry 220 also includes entry 217 indicating whether the file it points to is in fact a directory. This allows the file system itself to treat this file differently in accordance with the fact that it contains what is best described as the name space for the file system itself. Most importantly, however, typical inode entry 220 contains data pointer 215 which includes sufficient information to identify a physical location for actual data 310 residing in data portion 300 of the file system.

The file management system provides: (1) the capability of rapidly reading the inode file by block instead of by individual inode, allowing more efficient use of disk storage and also allows overlapping of the reading of inode entries across multiple disks; (2) the capability of splitting the workload into pieces which results in approximately equal stresses on the backup target, enabling the workload to be split according to the size of the file and also to be split in accordance with the number of files and further allows the scheduling of "worker" threads to do the actual data movement to the backup target or targets; and (3) the capability of backing up data from the same portion of the file name space to the same backup target every time, or for it to migrate to other backup targets to better balance the backup workload.

It is assumed herein that there is a backup facility which accepts and stores backup copies of data. Tape management and cataloging features of such a facility are used in the operation of the present invention; however, numerous examples of such products exist in marketplace. IBM's Tivoli Storage Manager is an example of one such product. IBM is also the assignee of the present invention. Relevant portions of the structure of IBM General Parallel File System (GPFS), which is similar in many ways to any file system conforming to the XOPEN standards for file systems, are now briefly considered in order to provide a context for a proper understanding of the present invention.

The starting point for the file system (i.e., shared file system) is a file system descriptor data structure, called the superblock, which resides at a known fixed point on the disks which comprise the file system. This structure is required in order to perform any action with respect to the file system. This structure has pointers to the disk location of two primary data structures utilized by the scalable file management system. The first of these primary data structure is inode file 200. The inode file is a collection of individual inodes which constitutes the data structure that describes the key properties of the file. This information is returned via the stat call. The entries in the inode file contain time stamps which reflect the last time that the file or its properties have been changed and it also indicates the size of the file. The inode for a file does not contain the name of the file. The file names are stored in the file system directory structure 100.

The second primary data structure comprises the root directory 100 for the file system, addressed by the file system superblock. The root directory is structurally the same as any other directory in that it contains a series of records including a name for a file or another directory, an inode number that points at an inode containing the properties of the file and in GPFS, a target-type field that describes whether the target of the directory entry is a file or another directory. A file which is named "rootdir/username/fileA" is located by searching the directory called "rootdir" which points to the inode representing the directory named "username". The directory named "username" contains the inode number of the file named "fileA". In normal access operations, each directory in the path and its corresponding inode must be accessed to find the data. Example operations include reading directory entries and then (usually interwoven) the inodes to which the directory entries refer.

The performance characteristics of the above-mentioned operations are monitored. A directory is a file in most UNIX style systems, wherein the read operation on a directory involves reading the directory inode and reading the appropriate directory blocks. Each read is a disk operation unless the access pattern and/or the amount of caching available allow the required data to be cached. Of specific interest herein are those cases where the size of the file system and the requirement that the metadata be available to multiple systems, make it unlikely that the required data be already cached.

There are two standard techniques used for backup. One of these techniques is "backup by inode." In this technique, one reads modes in bulk from the inode file and backs up the data associated with each inode file entry. The files are identified by inode number. This means that any attempt to restore an individual file by name involves significant custom programming that is not commonly done. The alternative and more common technique is to scan the file system name space looking for files which meet the backup criteria (e.g., modified after a specified date). By using the name space, the program does an inquiry on each file in the entire name space. The standard interfaces to do this require a read of the directory entry and the inode for the file; this process requires separate disk operations. This pass through the entire name space is extremely time consuming for larger file systems.

According to the scalable file management system disclosed herein, candidate selection starts by directory traversal at the root directory, without requiring stats to determine the directory structure. Access to the inode file is a parallelized sequential scan of the inode file.

The list of files generated from the directory traversal need not be in a completely sorted inode order for efficient parallel access to the inode file. Instead, the inodes can be partitioned into smaller buckets (ranges) of inodes. Utilizing said partitioning as the unit of work for a parallel scan, requires only the inodes within each range to be sorted. The sorting within each range may be performed by a conventional sort program. The number of inodes in each range can be adjusted so that all the records to be sorted "fit" within a fast random access memory of a computer, wherein sorting can be executed very quickly and with minimal input/output operation.

High speed operations for a file system, such as disclosed in U.S. Pat. No. 7,092,976, are performed in parallel on each range of inodes as disclosed herein. For example, as described in U.S. Pat. No. 7,092,976, typed directory entries may be used, allowing the complete file system namespace to be traversed without performing a single stat operation. The namespace traversal allows the file management program to construct the full path to every file by reading the only directory entries and not the inodes. The path names do not contain the stat information about each file, but they do contain inode number of each file.

According to the invention disclosed herein, stats may be performed using multiple (issued in parallel) sequential accesses to the file metadata. This essentially allows the stat of every file to be performed using sequential reads of large blocks of inodes, rather than random reads of individual inodes. This is termed "parallel sequential traversal" herein. It is not required to sort the list of file names into the order they are stored on the disk (i.e., parallel sequential traversal does not require a total inode sorted order). Traversal is divided into an arbitrary number of segments (buckets), wherein only the inodes within a segment must be in sorted order. The number of segments may be selected to match a desired degree of parallelism and/or to minimize time to sort each segment.

In one implementation, parallel directory traversal is implemented by multiple computing nodes and multiple threads at each computing node, with dynamic load balancing and redistribution of node queue entries. The results of the parallel directory traversal are distributed into result sub-buckets, indexed by a hash of the high bits of the inode number and the node number of the node that found the inode, wherein runs of consecutive inodes are kept together. The size of the buckets can be kept modest so that subsequent steps can be performed within available memory (e.g., dynamic random access memory) of a node, essentially eliminating external (I/O bound) sorting. This improves parallel sorting since sorting all of the inode space is not required by the system. Partitioning by hashing the high bits allows sorting each bucket, requiring only a fraction of the entire inode space. All sub-buckets for each hash result value are merged and sorted together, each one produced by a different node, providing all of the inodes in use within the file system that are in a range of inodes. The inodes within each range are read, exploiting the efficiency and speed with which (nearly) consecutively numbered inodes can be read, because they are arranged sequentially on disk tracks. Upon reading an inode, the policy rules or file selection criteria are evaluated. Said merging and sorting can be performed in parallel with, and pipelined to, the inode read and policy evaluation.

Figure 3:
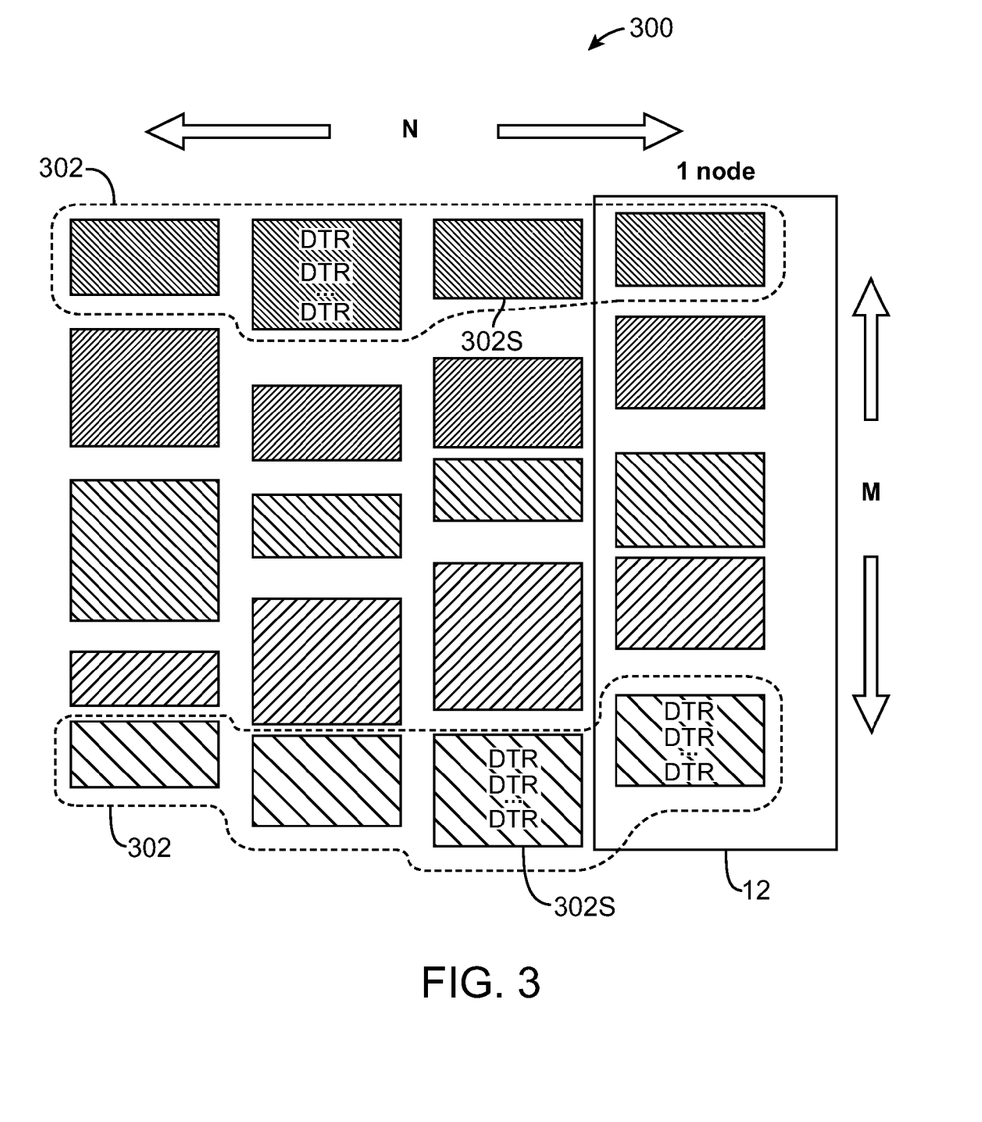
FIG. 3 shows an example inode space partitioned according to the disclosed file management system.

Referring to FIG. 3, in one example, an inode space 300 is partitioned into clumps or buckets (ranges) 302, so that there are long runs of consecutively numbered inodes (i.e., inode numbers) within each bucket. Each bucket (range) 302 is "spread" across N nodes 12, into N sub-buckets (sub-ranges) 302S. Multiple (M) buckets 302 are used to allow operation thereon in parallel. Each inode number i ($0<=i<$[a very large integer]) is mapped to a bucket number j ($0<=j<M$) with a function $f$ having desired properties. Preferably, runs of inode numbers all fall into the same disk blocks and disk blocks are allocated by powers of 2. As such, a number L is selected so that storage for $2^L$ consecutive inodes span several disk blocks (sufficient to gain efficiency from pre-fetching and buffering built into inode scan mechanisms such as GPFS or similar file systems).

An example of said function $f$ can be of form:

$f:=g(i\ modulo(2^L))$ or $f:=g(i>>L)$, which considering the binary representation of i, shifts to the right and discards the L low order bits of i.

The function g can be any (hash) function that takes large integers and maps them to said M bucket numbers ranging $0, \ldots, M-1$. In general g is selected to accommodate lack of apriori knowledge of the distribution of inode numbers actually used to represent files. For example, a simple function $g(k)=k\ modulo\ M$ may be used.

Figure 1A:
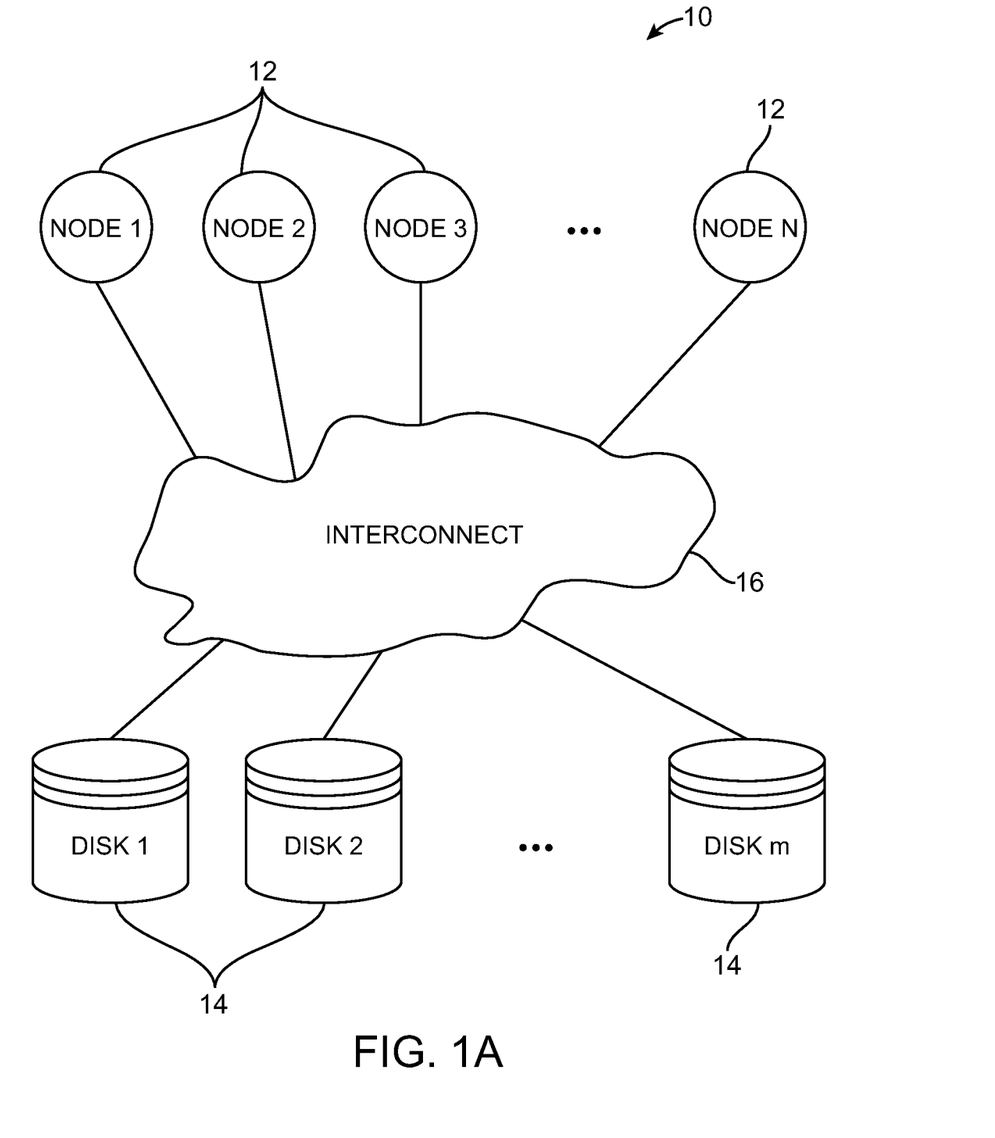
FIG. 1A shows the architecture of an example computing environment including computing nodes configured according to an embodiment of a file management system disclosed herein.
Figure 1B:
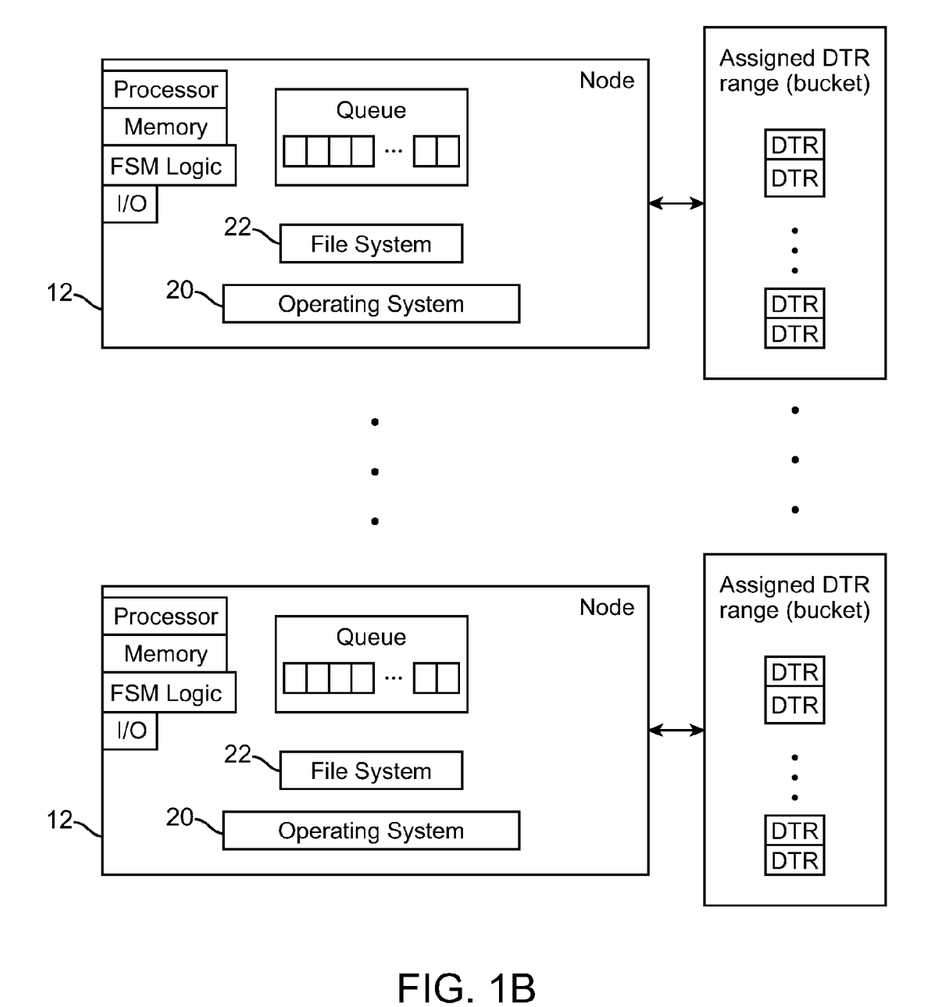
FIG. 1B shows the architecture of the computing nodes configured according to a file management system disclosed herein.
Figure 4:
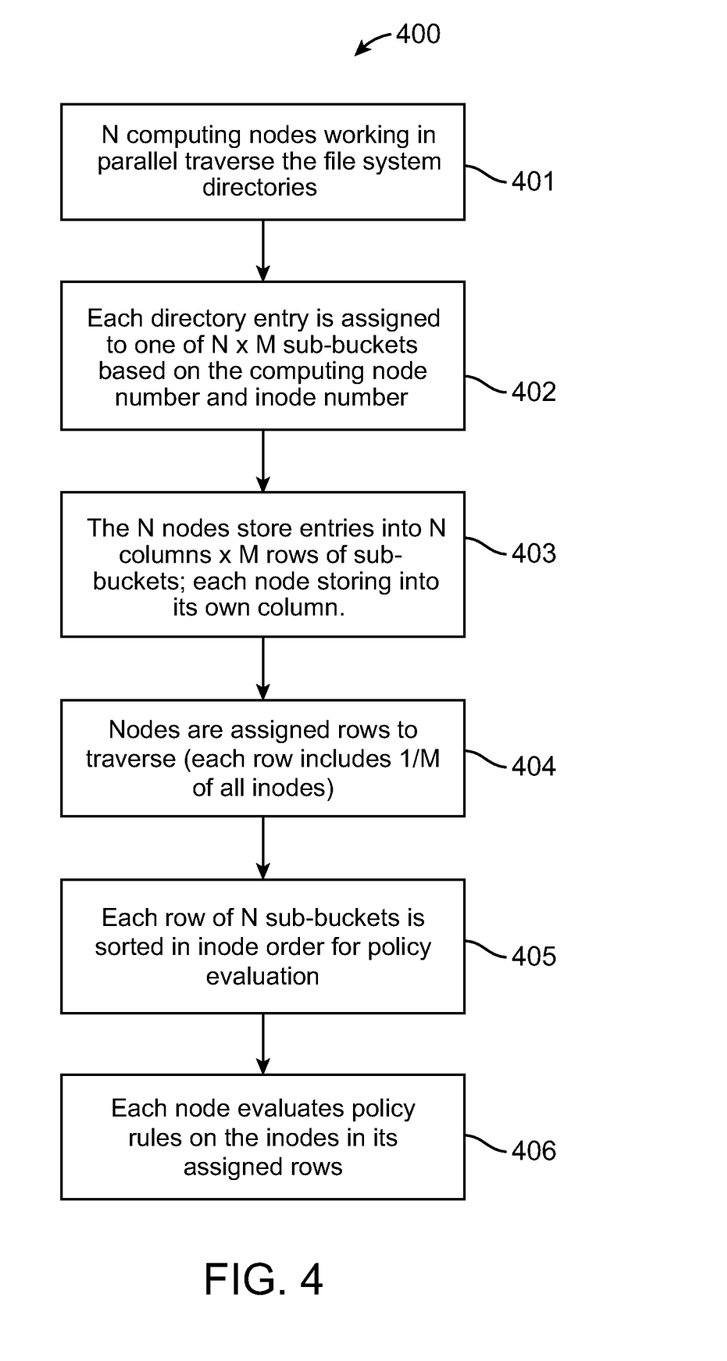
FIG. 4 shows a flowchart of a process implementing the disclosed file management system.

Referring to FIG. 4, in conjunction with FIGS. 1-3, the scalable file management system implements a process 400 including the following process blocks:

Block 401: N computing nodes working in parallel traverse (walk) the file system directories.

Block 402: Each directory entry is assigned to one of N×M sub-buckets 302S based on the computing node number and the inode number.

Block 403: The N nodes store entries into N columns×M rows of sub-buckets 302S (typically M>N), with each node storing into its own column of M sub-buckets 302S.

Block 404: In the next phase, nodes are assigned rows of N sub-buckets 302S to traverse. Each row of N sub-buckets 302S includes 1/M of all inodes.

Block 405: Each row of N sub-buckets 302S is sorted in inode order for policy evaluation.

Block 406: Each node evaluates policy rules on the inodes in its assigned rows.

As such, in a directory traversal phase, while executing a node-wise and thread-wise parallel directory traversal, each of N nodes can independently store directory traversal records (DTRs) [inode number, pathname] into its own set of M sub-buckets. Thus, no node-to-node coordination or locking is required to store a DTR into a sub-bucket during the directory traversal phase. At the end of the directory traversal, there are N×M sub-buckets representing M rows of N columns, each column written by a different processing node and each row representing a complete bucket. An example of a DTR is a tuple (inode number, pathname).

Further, according to the scalable file management system, directory traversal is distributed over N (several or many) computing nodes, wherein dynamic load balancing results in a factor N speedup over conventional file management methods.

In a scan phase comprising inode scan (and policy evaluation), each node accesses a row of N sub-buckets which logically comprises a complete bucket (as defined by the mapping function, f, above), and sorts all the DTRs in those sub-buckets into a sequence ordered by inode number. As such, the inode scan can most efficiently take advantage of the aforementioned pre-fetching and buffering. In addition, the -sub-buckets may be stored in a shared file system (such as GPFS) where each node can efficiently access any file.

Further, the number of buckets, M, can be selected to be large enough to divide the space of all inodes, such that the storage for the DTRs comprising any bucket can be sorted very quickly within the fast memory available to a node. This avoids the expense of a large input/output (I/O) intensive sort.

Further, the results of said sort can be "piped" (in the classical Unix sense) to the inode scan process, thus avoiding further I/Os which would otherwise be required to write out and read back the sorted bucket of DTRs.

Further, having partitioned the work and data into buckets, each bucket constitutes a unit of work which is recoverable/restartable/redoable, whereby the inode scan (with policy evaluation) phase may be fault-tolerant. More specifically, if the process assigned to scanning any particular bucket j fails in any way, the work of scanning bucket j can be re-initiated on any available computing node.

The scalable file management system can be programmed to tolerate faults in individual computing nodes, such that if some nodes fail during the process, work can be re-assigned to the "surviving" nodes. A fault-tolerant parallel directory scan is provided, and beyond GPFS policy evaluation, the scalable file management system can be used to greatly accelerate the execution of the classical UNIX/POSIX 'find . . . |xargs . . . ' paradigm.

Parallel Directory Traversal

Figure 5:
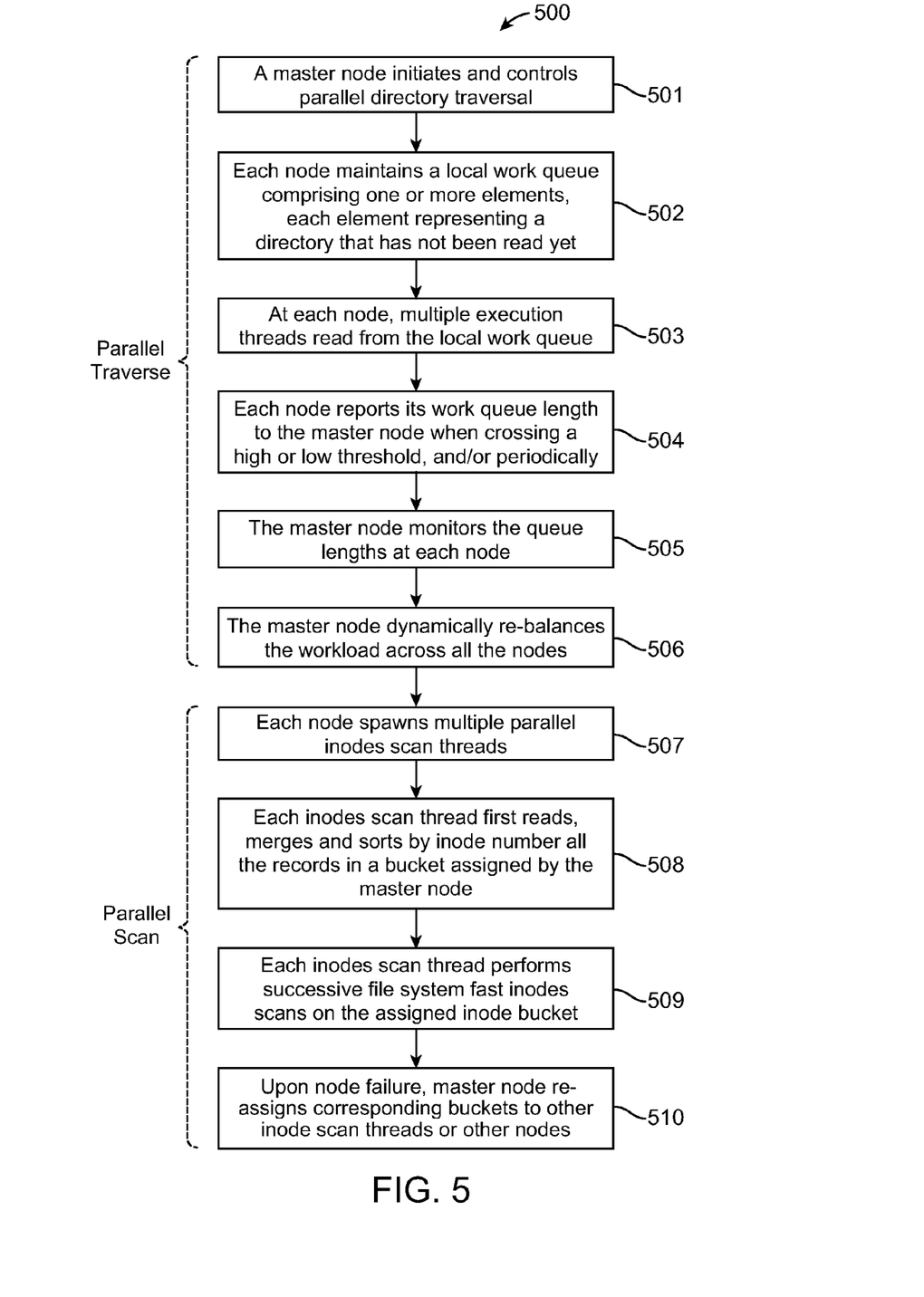
FIG. 5 shows a more detailed flowchart of a process implementing the disclosed file management system.

The scalable file management system quickens directory traversal by distributing directory traversal to multiple threads of execution on multiple computing nodes. The system eliminates conventional serially executed directory traversal that issues one stream of read commands to a collection of disks. The parallelized directory traversal disclosed herein issues multiple streams of essentially random read commands, thus exploiting available parallel (or concurrent) operation of many storage devices (disks) over which a large file systems directory may be spread. Referring to FIG. 5, an example parallelized directory traversal is organized according to a file system management (FSM) process 500. Each computing node implements the FSM process 500 as FSM logic (FIG. 1A). As shown in FIG. 5, the FSM process 500 includes process blocks 501-510, described herein below.

Block 501: A master node (e.g., Node 3, FIG. 1A) initiates and controls parallel directory traversal.

Block 502: Each node maintains a local work queue comprising one or more elements, each element representing a directory that has not been read yet.

Block 503: At each node, multiple execution threads read from the local work queue. The threads all operate within a single process on a single node, and use local mutexes to resolve contention for access to local process resources such as the local work queue of directories and the output files (sub-buckets of DTRs, described below). Each thread repeatedly dequeues an element, reads all the entries of the directory specified by said element, writes records (DTRs) describing each directory entry into sub-bucket files, and enqueues any sub-directory entries it reads onto the local queue of work elements. The threads continue until all the paths and files within the file system have been traversed.

Block 504: Each node reports its work queue length to the master node when crossing a high or low threshold, and/or periodically.

Block 505: The master node monitors the queue lengths at each node.

Block 506: The master node dynamically re-balances the workload across all the nodes based on the monitored/reported work queue length, by:
randomly shuffling its list of nodes;
scanning through the shuffled list of nodes looking for nodes that are under-utilized or over-utilized (having queues that are shorter than the low threshold or longer than the high threshold);
sending work elements from the master node local queue (if any are available) to the nodes that are under-utilized;
if there remain both under-utilized and over-utilized nodes, the master node requests the over-utilized nodes to send directory entries to the master node. When directory entries are received by the master node, it places them in the master's node local queue and restarts the re-balancing process (the re-balancing process may also be restarted whenever the master node receives a report of an under-utilized node).

GPFS stores the inodes that represent all the files of a file system in inode number order in a special file. A GPFS inodes scan can achieve high performance by reading (with pre-fetching) full disk blocks or tracks of inodes when scanning consecutive (or nearly consecutive) inode numbers. The parallel directory traversal stores records (DTRs) containing [inode-number, pathname] for the files it discovers in a multitude of output files (sub-buckets of DTRs) that will be written and then processed in parallel.

In order to fully utilize all computing resources (e.g., CPU, memory, I/O channels) while minimizing contention and minimizing use of cluster-wide locks within the GPFS cluster during both the directory traversal and the parallel inodes scan with metadata evaluation, the set of DTRs are partitioned into multiple sub-buckets. The DTRs within many or several sub-buckets can be written independently and in parallel by the GPFS computing nodes during the directory traversal.

During the inodes scan, the DTRs within many or several sub-buckets are independently, and in parallel, read, merged and sorted by inode numbers, with metadata evaluation. The sub-bucket files of DTRs are created within a directory of a file system that is set up for shared read/write access among all the nodes of the GPFS cluster. This directory can be within the GPFS file system being scanned or within another shared file system. The sub-bucket files are given names of the form: PIL.bucket_number.node_number.

The set of DTRs from the several sub-buckets with an identical bucket_number logically comprise one bucket of DTRs. Each DTR is assigned its bucket_number, wherein when all the records within all the sub-bucket files with the same bucket_number are merged and sorted by inode numbers into a single list. As noted, this sorted list of DTRs (records) will have long runs of nearly consecutive inode numbers. A sub-bucket 302S PIL.j.i is the subset of DTRs computed by node i, where the inode number of each DTR hashes to the number j. The $j^{th}$ bucket 302 is the subset of DTRs (computed by all nodes) where the inode number of each DTR hashes to the number j. As such, bucket j=Union {PIL.j.i:: for i ranging from 0 to N−1, wherein N is the number of nodes 12}.

Bucket numbers are assigned so that each bucket 302 has approximately the same number of records. A simple formula that in practice achieves both objectives is:

Bucket_number=(Inode_number>>L bits) modulo Number_of_buckets

L bits is selected so that $2^L$ encompasses several I/O blocks of inodes, sufficient to take advantage of I/O pre-fetching. For an example GPFS, a typical number for Lbits is 16. The notation i>>L means to consider the number i as a binary string and shift out the rightmost L bits. Equivalently i>>L is i divided by $2^L$ with the fractional part (or remainder) discarded. These are common notations in the C and Java (and other popular) programming languages.

Number_of_buckets is selected to be large enough so that both: a full bucket 302 of DTRs can be sorted in memory without the need for temporary files or encountering excessive virtual memory paging, and that there will be sufficient buckets to fully utilize all CPU and I/O channels during a parallel inode scan.

In an example GPFS, to scan a file system with one billion files, M=511 buckets are used, leaving about 2 million DTRs in each bucket. During the parallel directory traversal, each GPFS node i, writes DTRs to its own set of M output files (where M=Number_of_buckets). The sub-bucket files 302S are PIL.0.i, PIL.1.i, ..., PIL.M−1.i. The following holds true for each file directory entry traversed during the parallel directory traversal process: A DTR representing a file directory entry traversed by node i whose bucket number is j is written by node i to file PIL.j.i. The directory traversal yields pathnames of the allocated inode numbers of the file system.

Parallel Modes Scan with Evaluation of File System Metadata

Having found the pathnames of the allocated inode numbers of the file system (representing all of the files), one or more of the metadata associated with said files are to be retrieved. Then, one or more functions are to be evaluated on their pathnames and metadata. Typically, such functions are "policy" or "storage management" functions, for example of the form: If a file pathname matches a pattern and the metadata (or attributes) of the file (stored in the inode) indicate a condition, then perform an action.

The sub-bucket files of DTRs, written by the parallel directory traversal as described above, become the primary input to a highly parallel inodes scan process with evaluation of file system metadata. Said management process 500 in FIG. 5 further includes the following process blocks for a parallelized inodes scan process:

Block 507: Each node spawns multiple parallel inodes scan process threads.

Block 508: Each inode scan is performed on one bucket 302 (FIG. 3) of DTRs, assigned by the master node. Before beginning the inodes scan of a bucket, each inodes scan thread first reads, merges and sorts by inode number all the DTRs that comprise its assigned bucket.

Block 509: Each inodes scan thread performs successive GPFS fast inodes scans (with evaluation of file system metadata). Each inodes scan is performed on one bucket 302 (FIG. 3) of DTRs, assigned by the master node. As such, each scan thread successively requests a bucket number from the master node, and the master node replies by doling out a bucket number j that has not yet been assigned. The scan thread performs an inode scan on the inodes represented by the DTRs within the assigned bucket number j. This process continues until all buckets have been so processed.

Block 510: Upon node failure, master node re-assigns corresponding buckets to other inode scan threads on other nodes.

To best exploit the GPFS inodes scan facility, just before beginning the inodes scan of a bucket j, an inodes scan thread first reads, merges and sorts by inode number all the DTRs that comprise its assigned bucket j. These are the sub-bucket files named: PIL.j.0, PIL.j.1, ..., PIL.j.N−1, where N is the number of computing nodes that executed the parallel directory traversal process. On a POSIX or UNIX-like system this can be accomplished by spawning a process to execute a merge-sort of the records contained in the sub-bucket files that match the file name pattern "PIL.j.*". This pattern specifies all the sub-bucket files that comprise bucket j. Using appropriate POSIX system calls, commands and APIs, this can be programmed so that the output of the merge-sort process is "piped" into, and read by, the inodes scanning thread. When the Number_of_buckets is selected as noted above, all the DTRs can be read and held within a node fast memory (e.g., dynamic random access memory) and sorted without incurring additional file input/output operations.

The sub-bucket files for bucket j with names matching "PIL.j.*" are (typically) written by the different nodes during the parallel directory scan and are gathered and read by one thread on one particular node. This can occur in parallel for several threads on many nodes, each thread assigned a different bucket number, providing simultaneous, parallel and/or overlapping merge-sort executions and inodes scanning executions.

As such, DTRs are sorted into buckets, and the DTRs are sorted by inode number within each bucket. This allows reading read all the inodes needed (in essentially sequential order and in parallel), with each node/thread taking on the job of reading a subsequence of inode numbers. For backup purposes, scanning a (sub)tree of the file system namespace is performed using said parallel directory scan.

Fault Tolerance

Parallel inodes scanning allows fault tolerance in case of node failures. Should a node fail to perform an inodes scan of an assigned bucket j, the master node may re-assign the inodes scan of bucket j to another processing node. Since there are typically many buckets, the cost of re-assigning a bucket is relatively small compared to the cost of the entire job of processing all of the buckets. The parallel directory traversal also provides fault tolerance wherein each node periodically writes checkpoint records, recording its progress in writing output sub-bucket files. The master node retains copies of the work elements that are sent to each node, until said node checkpoints the receipt of the work elements and sends an acknowledgement message to its master.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 6:
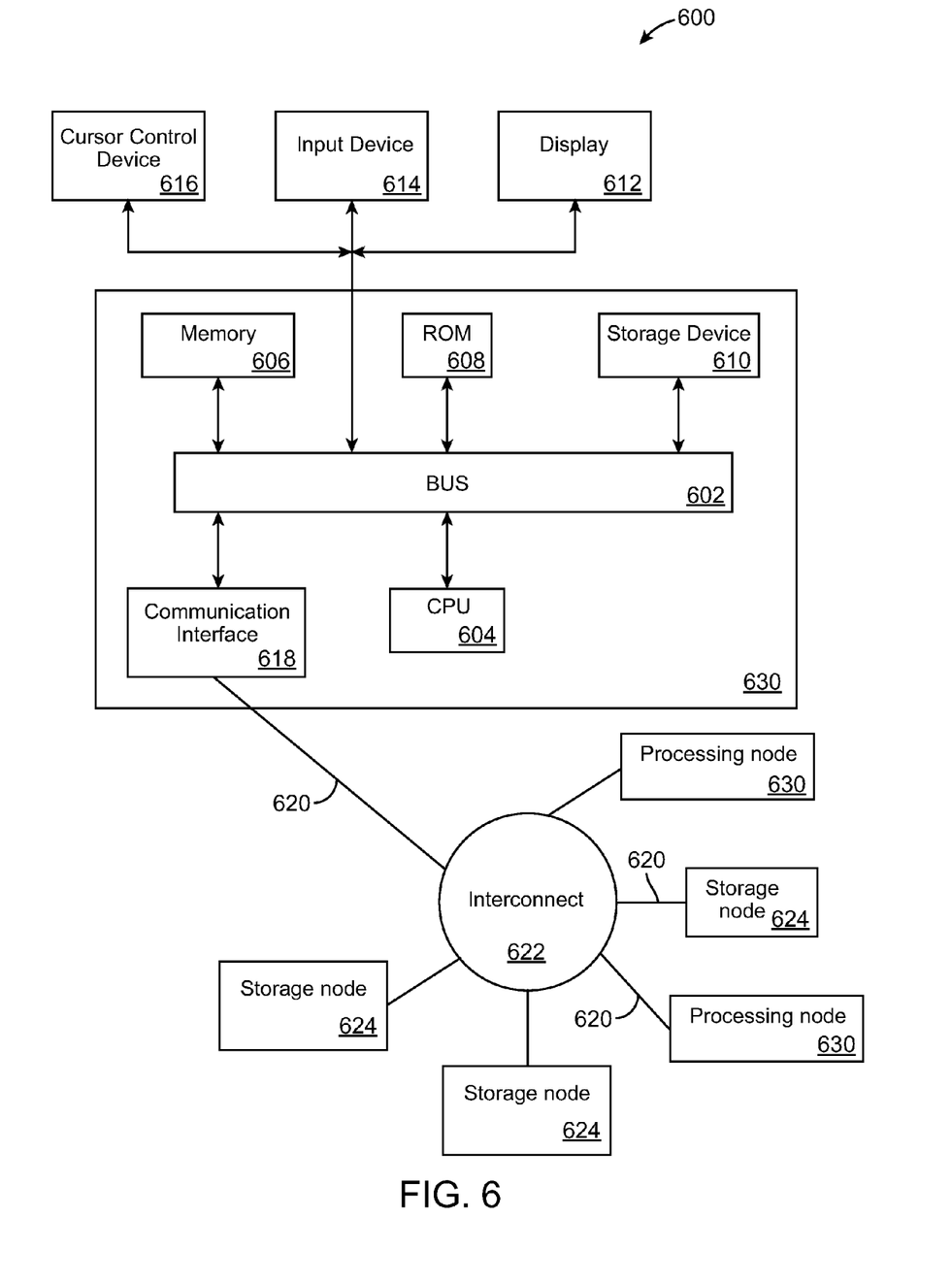
FIG. 6 shows a block diagram of an example computing system in which an embodiment of a file management system according to the invention may be implemented.

FIG. 6 shows a block diagram of example architecture of an embodiment of a system 600 for implementing an embodiment of the invention. The system 600 includes one or more processing or computing nodes 630 (such as nodes 12 in FIG. 1A). A processing node 630 includes a bus 602 or other communication mechanisms for communicating information, and a processor (CPU) 604 coupled with the bus 602 for processing information and program code. The node 630 also includes a main memory 606, such as a random access memory (RAM) or other dynamic storage device, coupled to the bus 602 for storing information and instructions to be executed by the processor 604. The main memory 606 also may be used for storing temporary variables or other intermediate information during execution or instructions to be executed by the processor 604. The processing node 630 further includes a read only memory (ROM) 608 or other static storage device coupled to the bus 602 for storing static information and instructions for the processor 604. A storage device 610, such as a magnetic disk or optical disk, is provided and coupled to the bus 602 for storing information and instructions. The bus 602 may contain, for example, thirty-two address lines for addressing video memory or main memory 606. The bus 602 can also include, for example, a 32-bit data bus for transferring data between and among the components, such as the CPU 604, the main memory 606, video memory and the storage 610. Alternatively, multiplex data/address lines may be used instead of separate data and address lines.

The node 630 may be coupled via the bus 602 to a display 612 for displaying information to a computer user. An input device 614, including alphanumeric and other keys, is coupled to the bus 602 for communicating information and command selections to the processor 604. Another type of user input device comprises cursor control 616, such as a mouse, a trackball, or cursor direction keys for communicating direction information and command selections to the processor 604 and for controlling cursor movement on the display 612.

The processing node 630 may be connected to other processing nodes via an interconnect network 622 (such as interconnect 16 in FIG. 1A). The system 600 further comprises multiple information storage nodes 624 (such disk systems 14 in FIG. 1A), connected to the interconnect 622, wherein the processing nodes 630 and the information storage nodes 624 can communicate therebetween.

According to one embodiment of the invention, the functions of the invention are performed by a node 630 in response to the processor 604 executing one or more sequences of one or more instructions contained in the main memory 606. Such instructions may be read into the main memory 606 from another computer-readable medium, such as the storage device 610. Execution of the sequences of instructions contained in the main memory 606 causes the processor 604 to perform the process steps described herein. One or more processors in a multi-processing arrangement may also be employed to execute the sequences of instructions contained in the main memory 606. In alternative embodiments, hard-wired circuitry may be used in place of or in combination with software instructions to implement the invention. Thus, embodiments of the invention are not limited to any specific combination of hardware circuitry and software.

Various forms of computer readable media may be involved in carrying one or more sequences of one or more instructions to the processor 604 for execution. For example, the instructions may initially be carried on a magnetic disk of a remote computer. The remote computer can load the instructions into its dynamic memory and send the instructions over a telephone line using a modem. A modem local to the node 630 can receive the data on the telephone line and use an infrared transmitter to convert the data to an infrared signal. An infrared detector coupled to the bus 602 can receive the data carried in the infrared signal and place the data on the bus 602. The bus 602 carries the data to the main memory 606, from which the processor 604 retrieves and executes the instructions. The instructions received from the main memory 606 may optionally be stored on the storage device 610 either before or after execution by the processor 604.

The node 630 may also includes a communication interface 618 coupled to the bus 602. The communication interface 618 provides a two-way data communication coupling to a network link 620 that is connected to the interconnect 622. For example, the communication interface 618 may be an integrated services digital network (ISDN) card or a modem to provide a data communication connection to a corresponding type of telephone line, which can comprise part of the network link 620. As another example, the communication interface 618 may be a local area network (LAN) card to provide a data communication connection to a compatible LAN. Wireless links may also be implemented. In any such implementation, the communication interface 618 sends and receives electrical electromagnetic or optical signals that carry digital data streams representing various types of information.

The example versions of the invention described herein may be implemented as logical operations in a distributed processing system such as the system 600 including the nodes 630. The logical operations of the present invention can be implemented as a sequence of steps executing in the nodes 630, and, as interconnected machine modules, within the system 600. The implementation is a matter of choice and can depend on performance of the system 600 implementing the invention. As such, the logical operations constituting said example versions of the invention are referred to for e.g. as operations, steps or modules.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for managing a shared file system, comprising:
performing traversal by multiple processing nodes in parallel of all directory paths and files in shared directories in the shared file system;
partitioning identified directory traversal records into ranges for the records in each range to be written independently in parallel by the multiple processing nodes;
scanning file inodes in parallel, each inode comprising file attributes of files stored in said shared directories and is assigned an inode number, and each range is assigned a range number;
mapping each inode number to a range number using a mapping function;
performing parallel execution threads in one or more processing node utilizing local mutual exclusions to resolve contention for access to local process resources, wherein during the scan of the file inodes, each processing node accesses a row of N sub-ranges that logically comprises a complete range, wherein N is a positive number; and
re-balancing a processing workload across the multiple processing nodes based on a monitored workload queue length at each processing node by a master node.

2. The method of claim 1, wherein the complete range is defined by the mapping function, and sorts all the directory traversal records in those sub-ranges into a sequence ordered by inode number.

3. The method of claim 1, further comprising:
maintaining a local workload queue of elements on each processing node, the elements representing a plurality of un-read shared directories;
reporting workload queue length by each processing node to the master node; and
monitoring the processing workload and workload queue length of the multiple processing nodes performing the directory traversal by the master node,
wherein re-balancing the processing workload across the multiple processing nodes comprises determining whether each processing node is under-utilized or over-utilized by comparing the monitored workload queue length with a predetermined queue length threshold, and redistributing work elements from over-utilized processing nodes to under-utilized processing nodes.

4. The method of claim 1, wherein upon a node failing to perform an inode scan of an assigned range, the master node reassigns the inode scan of the assigned range to another processing node.

5. The method of claim 4, wherein each node periodically writes checkpoint records for recording progress in writing output of sub-range files, and the parallel execution threads use local mutual exclusions for resolving contention for access to a plurality of local process resources.

6. The method of claim 5, wherein the master node retains copies of work elements sent to each node until a node checkpoints receipt of the work elements and sends an acknowledgement message to the master node.

7. The method of claim 1, wherein said scanning comprising reading full storage units of file inodes from each of the plurality of ranges of directory traversal records, wherein the file inodes represent all the files in the shared file system in an inode number order and are stored in an inode file, such that the file inodes read are specified by said records, wherein each set of records comprising a range is sorted by inode number.

8. The method of claim 1, wherein the function comprises a hash function that inputs integers and maps the integers to ranges.

9. A computer program product for managing a shared file system, the computer program product comprising a computer readable storage medium having computer usable program code embodied therewith, the program code readable/executable by one or more processing nodes to:
perform directory traversal, by multiple processing nodes, in parallel of all directory paths and files in shared directories in the shared file system;
partition, by the multiple processing nodes, identified directory traversal records into ranges for the records in each range to be written independently in parallel by the multiple processing nodes;
scan, by the multiple processing nodes, file inodes in parallel, each inode comprising file attributes of files stored in said shared directories and is assigned an inode number, and each range is assigned a range number;
map, by the multiple processing inodes, each inode number to a range number using a mapping function;
perform, by the multiple processing nodes, parallel execution threads utilizing local mutual exclusions to resolve contention for access to local process resources, wherein during the scan of the file inodes, each processing node accesses a row of N sub-ranges that logically comprises a complete range, wherein N is a positive number; and
re-balance a processing workload across the multiple processing nodes based on a monitored workload queue length at each processing node by a master processing node.

10. The computer program product of claim 9, wherein the complete range is defined by the mapping function, and sorts all the directory traversal records in those sub-ranges into a sequence ordered by inode number.

11. The computer program product of claim 10, further comprising program code to:
maintain, by the multiple processing nodes, a local workload queue of elements at each processing node, the elements representing a plurality of un-read shared directories;
report workload queue length, by the multiple processing nodes, to the master processing node;
monitor, by the multiple processing nodes, processing workload and workload queue length of the multiple processing nodes performing the directory traversal by the master processing node, wherein re-balance the processing workload across the multiple processing nodes comprises determining whether each processing node is under-utilized or over-utilized by comparing the monitored workload queue length with a predetermined queue length threshold, and redistributing work elements from over-utilized processing nodes to under-utilized processing nodes.

12. The computer program product of claim 9, wherein upon a node failing to perform an inode scan of an assigned range, the master node reassigns the inode scan of the assigned range to another processing node.

13. The computer program product of claim 12, wherein each node periodically writes checkpoint records for recording progress in writing output of sub-range files.

14. The computer program product of claim 13, wherein the master node retains copies of work elements sent to each node until a node checkpoints receipt of the work elements and sends an acknowledgement message to the master node.

15. A system for managing a shared file system, comprising:
a plurality of storage nodes; and
a plurality of processing nodes coupled to the information storage nodes, each processing node performs traversal in parallel of all directory paths and files in shared directories of the file system, partitions identified directory traversal records into ranges for the records in each range to be written independently in parallel by the plurality of processing nodes, scan file inodes in parallel by the plurality of processing nodes, each inode comprising file attributes stored in said shared directories, each inode is assigned an inode number, and each range is assigned a range number, and map each inode number to a range number using a mapping function, wherein during the scan of the file inodes, each processing node accesses a row of N sub-ranges that logically comprises a complete range, and the plurality of processing nodes maintain a local workload queue of elements at each processing node, perform parallel execution threads utilizing local mutual exclusions to resolve contention for access to local process resources, wherein traversal processing workload and reporting workload queue length of the plurality of processing nodes is monitored by a master processing node that re-balances the processing workload across the plurality of processing nodes.

16. The system of claim 15, wherein the complete range is defined by the mapping function, and sorts all the directory traversal records in those sub-ranges into a sequence ordered by inode number, wherein N is a positive number.

17. The system of claim 16, wherein the elements representing un-read shared directories, and reporting workload queue length by each processing node to the master processing node, wherein the master processing node re-balances the processing workload across the plurality of processing nodes based on comparing the monitored workload queue length with a predetermined queue length threshold, wherein re-balancing of the processing workload by the master processing node comprises determining whether each processing node is under-utilized or over-utilized, and redistributing work elements from over-utilized processing nodes to under-utilized processing nodes.

18. The system of claim 17, wherein upon a processing node failing to perform an inode scan of an assigned range, the master node reassigns the inode scan of the assigned range to another processing node.

19. The system of claim 18, wherein each processing node periodically writes checkpoint records for recording progress in writing output of sub-range files, and the master node retains copies of work elements sent to each processing node until a processing node checkpoints receipt of the work elements and sends an acknowledgement message to the master node.

* * * * *